Jan. 1, 1935. G. H. LELAND 1,986,002
METHOD AND APPARATUS FOR TESTING EYES
Filed Aug. 5, 1933 3 Sheets-Sheet 1

INVENTOR.
GEORGE H. LELAND.
by
his ATTORNEY.

Jan. 1, 1935. G. H. LELAND 1,986,002
METHOD AND APPARATUS FOR TESTING EYES
Filed Aug. 5, 1933 3 Sheets-Sheet 3

INVENTOR.
GEORGE H. LELAND.
by
his ATTORNEY.

Patented Jan. 1, 1935

1,986,002

UNITED STATES PATENT OFFICE 1,986,002

METHOD AND APPARATUS FOR TESTING EYES

George H. Leland, Dayton, Ohio

Application August 5, 1933, Serial No. 683,789

56 Claims. (Cl. 88—20)

This invention relates to a method and apparatus for testing eyes and is designed more particularly for indicating the presence of refractive errors and for indicating the extent of these errors to enable the proper lenses or glasses to be prescribed for neutralizing the same.

It has long been known professionally that the eyes in performing their function in the act of vision are responsive to two predominant stimuli, namely, accommodation stimulus and fusion stimulus. In order that either eye singly may provide sharp and distinct vision it is necessary that its refractive medium be responsive to the stimulus of accommodation. In like manner, if both eyes together are to provide single vision it is necessary that the extra ocular muscles be responsive to the stimulus of fusion so that the images of the same object of vision formed on the retinae of the two eyes will substantially superimpose corresponding points.

In changing vision from a distant to a close object, the combined response to these two stimuli is a synchronized movement to effect these two essential functions. The one function is the increase of accommodation in each individual eye in order to retain proper sharp foci of the light rays from the close object upon the retina. The other function is the increase of convergence of the two eyes in order to retain single vision of the close object.

In this synchronized movement of the eyes to accomplish these two functions, accommodation and convergence, there is a natural and inherently functioning coordination in the manner of a partial cross response to the two stimuli. That is, when accommodation is stimulated as if to perform the act of close vision, convergence is also stimulated (but in a degree varying with different individuals, etc.) so that some degree of convergence takes place along with response of the accommodation to the accommodation stimulus. In like manner, when convergence is stimulated by the demand for fusion in close vision, accommodation is also stimulated (but again in a degree varying with different individuals, etc.) so that to some degree accommodation takes place along with response of convergence to the fusion stimulus. In other words, not only does each of the predominant stimuli stimulate to effect its own function directly and completely, but in a varying degree it also stimulates the other function. Stimulus of accommodation stimulates accommodation directly and completely and convergence indirectly and to a varying degree. Stimulus of fusion stimulates convergence directly and completely and accommodation indirectly and to a varying degree.

The accurate determination of the various relations of these functions under conditions of distant (static), near (dynamic) and close (reading) vision is very essential in the proper prescription of refractive ocular correction. These facts have long been recognized and the said relations have been determined, and utilized as thus determined, with more or less accuracy. One of the determinations, namely, that of measuring the state of convergence in the absence of fusion stimulus and while the eyes are responsive to the accommodation stimulus only has been taken easily at different distances, and with a satisfactory degree of accuracy. The other determination, namely, that of measuring the state or position of accommodation in the absence of accommodation stimulus and while the eyes are responsive to the fusion (or convergence) stimulus has not previously been taken except objectively, and with rather uncertain accuracy.

Tests or examinations of the eyes as heretofore made have involved two rather basically divergent methods. The theory of the oculist involves introducing a drug into the eyes to inhibit the responsiveness of the eyes particularly to the said accommodation stimulus. The theory of the optometrist is that by means of suitable instruments a sufficiently correct appreciation of the necessary corrections may be attained by the utilization of instruments which are sufficiently accurate in determination, without the inhibiting effect produced through the use of drugs.

However, each of these methods, as long practiced, has been subject to serious and extraordinary defects and shortcomings. Since certain of the muscular reactions of the eyes are quite beyond the control of the individual, as set out above, that is, since the accommodation and convergence reactions are necessarily interrelated and intereffective one with the other, it has been heretofore quite impossible by means of any testing instrument to secure a complete examination of the eye when free from indeterminate influences. Therefore, it has been impossible to secure a complete and correct determination of the condition of the eyes.

Likewise, since the utilization of drugs results in inhibiting the normal response of the eyes to the stimuli, the determination which is secured from the eyes, when under the influence of such drugs, is not at all indicative of the actual condition of the eye when in its normal or natural state. Oculists generally recognize this and provide a corrective or error factor to their determination, which factor is in the nature of a scientific guess based in each instance upon the experience of the oculist, supplemented by the generalizations based on the common experience of the profession.

The inevitable result of each system of test has been to provide a reasonable approximation to the actual conditions existant; and in many instances that approximation is sufficiently close so that the individual's needs are approximated with a reasonable, and ordinarily a satisfactory, degree of correctness. But in those unusual cases, where the usual error factors of correction do not apply, and where the usual responses may not be detected by the carefully constructed instruments, the result is an extraordinarily unfortunate one, and may be such a tremendous departure from what is actually needed as to produce results more unfortunate for the patient than would be the case if the presumably corrective glasses were dispensed with entirely.

One object of the present invention is to provide a simple method of examining, or testing, eyes for refractive correction which may be easily performed and which will enable the errors to be determined with a high degree of accuracy.

A further object of the invention is to provide for a simple, accurate and dependable method of testing eyes, and a simple apparatus for effecting such testing, whereby the eye is examined when in its normal or natural state, free from the disturbing influences which would otherwise be present, so that a true and accurate determination of the necessary correction may be secured.

Another object of the invention is to provide for a subjective method of accurately testing eyes. This is accomplished by subjecting the eyes to such stimuli that each eye may be tested separately in its normal or natural state,—this normal or natural state being attained through maintaining both eyes in that natural condition which results from normal response to the fusion stimulus, and while doing so subjecting the eyes separately to test for deviation from normal when free from the effects of accommodation stimulus. That is, the present invention provides for subjecting each eye to test for accommodation or refractive correction while it is maintained in its natural state, free from the disturbing effect of accommodation stimulus.

Another object is to provide apparatus which is effective for carrying out the aforesaid method of eye testing and of accurately determining the condition of the eyes.

Another object of the invention is to provide a device for intermittently occluding the vision of the eye not being examined so as to provide simultaneous visual perception for the eye under test during the functional maintenance of binocular single vision.

Other objects and advantages of the invention will be apparent from the following description, the appended claims and the accompanying drawings.

In the accompanying drawings

The method and apparatus described herein provides a very accurate and dependable subjective method of making the determinations. In this invention and method of testing use is made of the natural phenomenon that the human eyes do not receive accommodation stimulus from a red light target or object used but do receive fusion stimulus. As the accommodation is not stimulated by accommodation stimulus, the accommodation retains a state of rest influenced only by the other functions of vision. In this state its refractive deviation from normal can be neutralized by trial lenses and determined accurately at any desired distance, such as 6 meters, 1 meter, and ⅔ or ⅓ meter, commonly spoken of as static, dynamic, and reading examinations.

It is well known professionally that the utmost eye comfort and perfect vision is dependent upon the following factors. (a) The correction of the astigmatic error in the individual eye, (b) the balancing of one eye with the other in their spherical refractive relation, and (c) the proper value of this spherical refraction of the two eyes together to attain an even tension balance between the two functions of accommodation and convergence. For purpose of explanation it can be assumed that the eyes of an individual have a static position of accommodation and at the same time a static position of convergence. The purpose of examination as hereinafter set out is (a) to determine the proper cylindrical lens value and axis for same to correct the astigmatic errror in each individual eye (the astigmatic error remains substantially constant throughout the eye's entire accommodation range), (b) to determine the proper spherical lens value to neutralize the accommodative deviations of each individual eye from the normal while the eyes are maintained in their static position influenced by all the vision stimuli except stimulus of accommodation, and for different distances, (c) to determine the proper prismatic lens value to neutralize the convergence deviation of the two eyes from the normal while the eyes are maintained in their static position influenced by all the vision stimuli except stimulus of fusion, and for different distances, (d) to analyze the various determinations and prescribe the best refractive lens values to properly balance the various deviations from the normal and thereby provide the most comfortable, efficient and perfect vision.

My method of examining eyes, or, as it is more frequently called, testing eyes, consists briefly in presenting to the eye which is being examined a fixation object, commonly called a target, which preferably comprises a narrow elongated line of light and which is spaced from the patient a distance representing vision at infinite distance, usually about twenty feet. To enable the presence of astigmatism, as well as hyperopia or myopia, to be determined it is desirable that the fixation object shall comprise a plurality of radial lines and shall be rotatable. The fixation object is preferably illuminated and darkened alternately at predetermined intervals of time so that the object will appear intermittently to the patient. While for some examinations or tests the object may be completely obscured betweeen illuminations or flashes I prefer to maintain a dim illumination during this period as this serves to keep the patient's eyes directed constantly toward the fixation object and, in the proper position to receive succeeding flashes. Simultaneously with each bright illumination or flash that eye of the patient which is not undergoing examination is occluded so that the patient sees the brightly illuminated figure only with the eye which is being examined. At the end of the bright illumination the obstruction is withdrawn and the patient sees the dim illumination with both eyes, thereby providing substantially a state of continued fused binocular vision, this being due to the fact that the convergence or fusion stimulus is very quick to cause fusion of the pictures seen by the separate eyes but when once formed fusion will continue relatively undisturbed through short interruptions of vision of either eye.

A normal or emmetropic eye will see the illuminated object in substantially its actual form, the lines being sharply defined and of substantially actual width, but to an ametropic eye the figure or lines will be distorted, the character and extent of the distortion depending upon the character and extent of the refractive error in the eye. To determine the character and extent of the error of refraction which is present in the eye under examination the operator requires the patient to describe the appearance of the illuminated figure, to the unaided eye, and then places before the eye, successively, trial lenses of different values until the patient sees the illuminated figure in its correct form, that is, the lines appear to be sharply defined and of substantially actual width, and the value of the lens which brings about this result indicates the character of the correction required, as will be more fully explained in connection with the use of the apparatus. The eyes are examined successively in this manner and after examination of both eyes has been completed with the distant object a smaller illuminated object, similar to the distant object, is presented to the eyes of the patient at approximately normal reading distance, usually from thirteen to sixteen inches from the eyes, and the examination repeated in the same manner. This close examination will enable the operator to determine the lag of accommodation behind convergence when the patient's eyes change fixation from the distant object to the close object.

The apparatus employed for carrying out the method may take various forms but I have secured very accurate results with the apparatus here illustrated. In this apparatus the fixation object for the distant static test comprises a plurality of narrow elongated lines of light and is shown in the form of an opaque screen having a plurality of elongated openings or slots. The screen preferably consists of a disk 10, Figs. 6 and 7, rotatably mounted upon a suitable supporting frame 11 and provided with elongated openings 12 arranged to form a figure. The figure thus formed may be of any suitable shape and may include any desired number of lines but, as here illustrated, it comprises a plurality of short lines arranged radially about a common center. The openings in the screen may vary in width and in length but in the particular device here shown each slot is about two inches long and approximately forty-five thousandths of an inch in width.

Figures 6, 7, 8, 9:
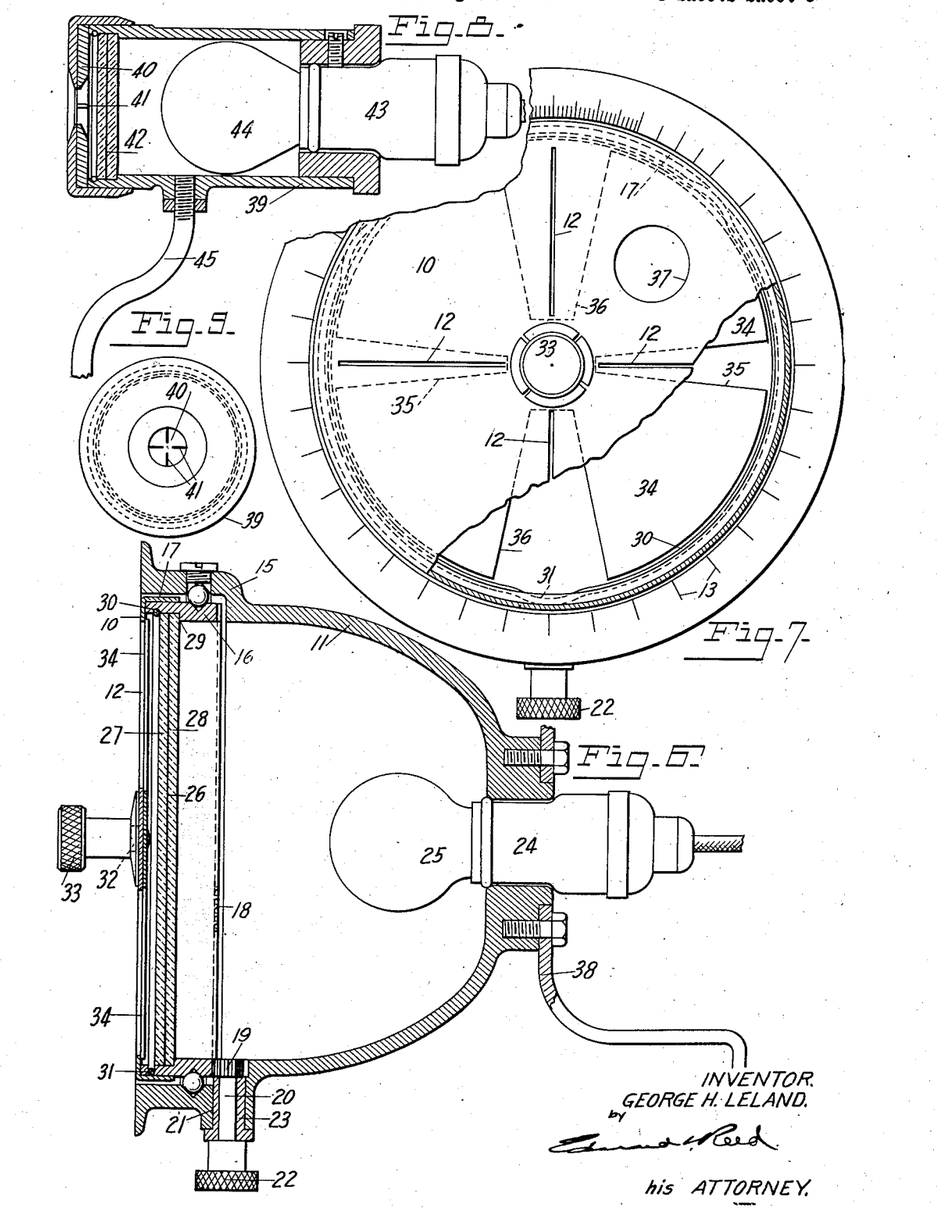
Fig. 6 is a sectional view of the distant fixation object.
Fig. 7 is a front elevation of a distant fixation object, partly broken away.
Fig. 8 is a sectional view of a close fixation object.
Fig. 9 is a front elevation of the close fixation object.

To enable the device to be used to determine astigmatism it is preferable that there should be at least four lines radiating from the axis of the screen and spaced equal distances apart. It is desirable that the inner ends of the several lines should be spaced from the axis of the screen so that the adjacent ends of each pair of alined lines will be spaced a substantial distance apart. The frame which supports the screen is provided with graduations 13 about the edge of the screen to indicate the angle of adjustment of the latter, which is determined by the location of one of the radial slots with relation to the graduations.

In the particular construction here illustrated the supporting frame 11 for the screen is cup-shaped and has at its open end an enlarged portion 15 in which is rotatably mounted an annular member 16 which carries the screen 10. The screen may be secured to the rotatable member in any suitable manner but, in the present instance, the disk forming the screen is provided with a rearwardly extending peripheral flange 17 which fits snugly about the rotatable member and supports the screen in fixed relation thereto, but permits the screen to be readily removed should it be desired to substitute therefor a screen having a different figure. The screen is adjusted about its central axis by rotating the annular member 16 and for this purpose I have shown this annular member provided on its rear edge with fine serrations 18 forming gear teeth with which meshes a pinion 19 carried by a shaft 20 rotatably mounted in a bearing 21 in the side wall of the supporting frame 11 and having on its outer end an actuating member or knob 22. In order to maintain the pinion 19 in proper engagement with the teeth of the annular member 16 I have provided the bearing 21 with a rotatable eccentric bushing 23 in which the shaft 20 is mounted. By adjusting this bushing about the axis of the shaft the pinion may be moved toward or from the annular member 16. The closed rear end of the supporting frame has mounted therein a lamp socket 24 to receive an electric lamp 25, which is thus spaced some distance to the rear of the screen, and between this lamp and the screen I have interposed a color screen or filter to cause the figure in the opaque screen to be illuminated with light of the desired color. I prefer to employ a red light for this purpose because the use of the color red in the fixation object provides very little, if any, stimulus of accommodation and does not affect the response to any other vision stimulus. On the other hand, so far as perception of the color red is concerned the eye is very sensitive. When the eye is free from the stimulus of accommodation, but is subject to the other stimuli of vision, it is in the ideal condition for the correction of the refractive errors and the location of the most perfect state of artificial emmetropia. In the present construction the color screen comprises a thin sheet of gelatinous material of ruby red color, as shown at 26, and this sheet of material is confined between two plates of glass 27 and 28, the front plate 27 being of clear glass and the rear plate 26 of ground glass. The color screen as a whole is mounted in the rotatable annular member 16, the rear plate 28 being seated against a shoulder 29 and the front plate 27 being engaged by a split resilient ring 30 which is seated in a groove in the annular member. If desired, the groove in the annular member may extend entirely through the latter at one or more points in its circumference, as shown at 31, so that outwardly bent portions of the resilient ring may extend through the annular member and engage the flange 17 of the disk 10, thereby exerting thereon a pressure which tends to more firmly retain it on the annular member. The pressure thus exerted on the flange is not sufficient to press the same into engagement with the surrounding portion of the supporting frame and the annular member and the disk carried thereby are free to rotate in that frame.

In different examinations, or at various stages of the same examination, it may be desirable to use for a fixation object a figure or figures having different characteristics. The removability of the opaque screen makes it possible to substitute other screens therefor but for ease of operation I have provided the present device with means whereby the character of the figure on the screen may be varied. For this purpose I have arranged on the inner side of the screen a rotatable plate or shutter which is secured to the inner end of a stud 32 mounted at the axis of the screen or disk 10 and having its outer end projecting forwardly beyond the screen and provided with a knob 33. This plate comprises four sector-shaped sections 34, the adjacent sections being separated one from the other by radial slots 35 and 36 which are of a width substantially greater than the width of the slots in the screen, and the edges of which are radial. When the screen is being used with its normal figure, the four radial slots, the plate 34 is so positioned that the slots 35 and 36 register with the slots 12 in the screen. The slots 35 in the plate 34 are of less width than the slots 36 and by imparting a slight rotation to the plate the slots 35 may be moved out of line with the corresponding slots 12 in the screen and the latter slots obscured by the adjacent sector-shaped sections. This movement need not be great enough to move the wider slots 36 out of line with the corresponding slots 12 in the screen and when the plate 34 is so positioned the figure on the screen will consist of two straight lines arranged in alinement and separated by having their adjacent ends spaced apart. The screen is also provided with a round opening 37 spaced some distance from the center thereof and so arranged that when any of the slots 12 are visible the opening 37 will be closed by the plate 34. By imparting a slight further rotation to the plate 34 the slots 36 therein will be moved out of line with the corresponding slots 12 in the screen and the opening 37 uncovered, so that the fixation object will then present merely a round spot of light.

The supporting frame 11 of the fixation object may be mounted in any suitable manner and in the desired location. As here shown, it is provided with a bracket 38 by means of which it may be attached to an upright support, such as the wall of a cabinet.

The smaller fixation object or chart, used for the close or reading test, is preferably substantially similar to the distant fixation object and, as shown in Figs. 8 and 9, it comprise a supporting frame or casing 39 at the forward end of which is mounted an opaque disk or screen 40 having therein two intersecting slots 41, which are arranged in the same manner as the slots 12 in the disk 10. The scale of these slots is determined approximately by the ratio of the two distances generally used in the examinations, that is, twenty feet for the distant examination and not to exceed sixteen inches for the close examination. The width of the red line in either instance subtends about the same arc of the retina and therefore will result in the same acuity of perception. In the present device these slots are about three-sixteenths of an inch long and about four thousandths of an inch in width. In the rear of these slots is supported a color screen 42 similar to the screen above described and in the rear end of the casing is a lamp socket 43 to receive an incandescent lamp 44. The casing is provided with means, such as a standard 45, for mounting the same on a suitable support. Preferably it is removably mounted on a trial lens supporting device or phoroptor so that it can be removed during the distant examination.

In some cases it is desirable to make the dynamic test with a fixation object or target arranged in an intermediate position, that is, between the close object and the distant object, usually at a distance of about one meter. For this purpose I have provided a third fixation object 46 which is similar in construction and operation to the close object 39 but is slightly larger in size. This third fixation object is adjustably mounted on a stand 47 so that it can be readily moved into and out of the line of vision.

The figures of the several fixation objects may be alternately illuminated and darkened, either simultaneously or selectively, in any suitable manner which will cause each bright illumination or flash of the figure to be followed by a period of dim illumination or relative darkness.

Figures 10, 11, 12:
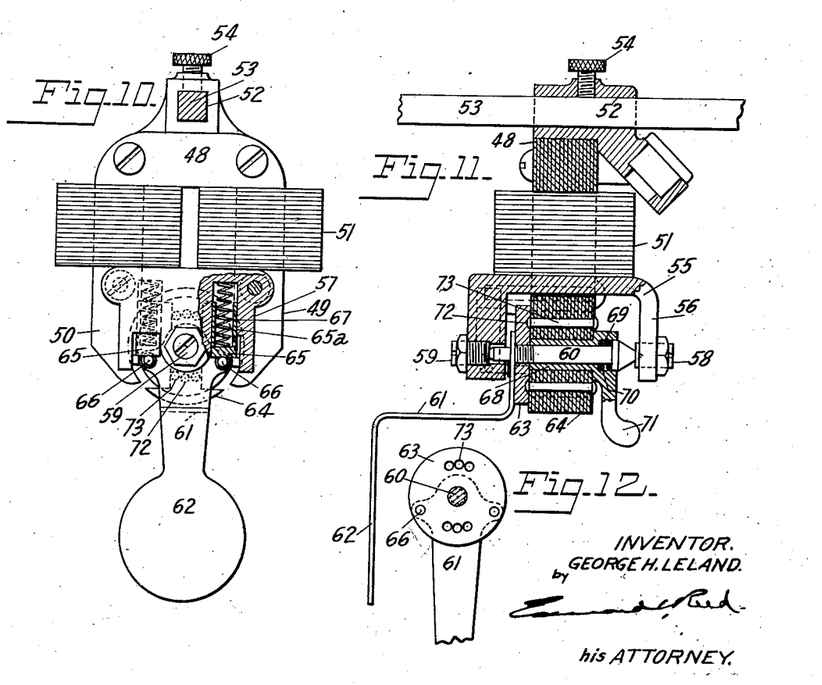
Fig. 10 is a front elevation of the occluder.
Fig. 11 is a vertical sectional view of the occluder.
Fig. 12 is a detail view of the adjusting device for the occluder.

Due to the physiological fact that a person observing an object with binocular vision is unable to determine from which eye the sense of vision occurs it is necessary that he should observe the fixation object with one eye only when the form of the object is to be noted, otherwise the operator would not know on which eye to make the lens adjustment. I have therefore provided an occluding device which will occlude the vision of the eye which is not to be examined during the bright illumination of the fixation object and will permit that eye to view the fixation object during the period of dim illumination. The occluding device may be mounted in any suitable manner but is preferably arranged fairly close to the eyes of the patient. In examining the eyes suitable means are provided for supporting a trial lens before the eyes of the patient and this means may consist of a trial lens frame supported on the head of the patient or it may consist of a floor stand on which the trial lens frame is supported, which is commonly known as a phoroptor, and I prefer to mount the occluding device on this phoroptor. The occluding device comprises a shutter or disk and means for moving the same into and out of line of vision of one eye of the patient. The operation of the disk is so timed that it will be moved into the line of vision simultaneously with the bright illumination of the fixation object and will be moved out of the line of vision at the end of the bright illumination, so that during the bright illumination the patient will view the fixation object with one eye only while during the dim illumination he will view the fixation object with both eyes. The occluding device may take various forms but it is preferably magnetically operated and, as here shown, comprises a frame 48 having downwardly extending arms 49 and 50 which constitute pole pieces and about which is supported a magnet coil 51. The upper end of this frame is provided with an opening 52 to receive a rod 53 which extends forwardly from the phoroptor and on which the occluder is secured in adjusted positions by means of a set screw 54. Arranged between the arms 49 and 50 and extending beyond the front and rear sides thereof is a bracket 55 which is rigidly secured to the frame and has at its ends downwardly extending parts 56 and 57 provided with bearings 58 and 59 in which is rotatably mounted a shaft 60. Secured to this shaft for movement therewith is a downwardly extending arm 61 having its lower end portion 62 enlarged to form the shutter or disk of the occluder. In the present instance, the lower portion of the arm is offset from the upper portion thereof to locate the disk in front of the magnet and nearer the eyes. The arm 61 may be secured to the shaft in various ways but preferably it is secured to a disk 63 which is rigidly mounted on the shaft. Mounted on the shaft 60 is the magnet armature 64, here shown as of a well known laminated construction, and this armature is so connected with the disk supporting arm 61 that the arm will normally be caused to move in unison with the armature. Yieldable means are provided for retaining the shutter or disk 62 in a neutral or inoperative position when the magnet is de-energized and, in the present construction, spring pressed plungers 65 are arranged on the respective sides of the armature shaft 60 and engage pins 66 carried by the disk supporting arm 61, the arrangement being such that the plungers will normally hold the arm in its neutral position. The plungers 65 are slidably mounted in cylindrical bores 65a in the end member 57 of the bracket 55 and are acted upon by light springs 67 which tend to move the same outwardly. Each plunger fits in its bore with sufficient tightness to impart to it the function of a dash pot, which will absorb a portion of the energy imparted to the disk by the action of the electro-magnet and the return springs, thereby preventing bouncing or vibration at either end of the stroke. The armature 64 is so shaped and arranged that when in an intermediate position, as shown in Fig. 10, it will be spaced from both pole pieces, 49 and 50, and will not be attracted by either pole piece when the magnet is energized, and when it is in this position the occluder is inoperative. To render the occluder operative the armature is adjusted with relation to the shaft 60 to bring one edge thereof into such relation to one of the pole pieces that it will be attracted by that pole piece and moved further toward the same when the magnet is energized. For this purpose the armature is rigidly secured to a sleeve 68 which is rotatably and slidably mounted on the shaft 60 and has one end projecting beyond the armature and provided with a recess 69 in which is located a spring 70 confined between a head on the shaft and the inner end wall of the recess, and thus tending to move the sleeve and the armature lengthwise of the shaft, this movement being limited by the disk 53 which is rigidly secured to the shaft. The sleeve is also provided with a finger piece 71 by means of which it may be adjusted. A suitable detent is provided for retaining the armature in adjusted positions and preferably the armature is provided adjacent to the disk 63 with a stud 72 adapted to enter any one of a series of recesses 73 formed in the inner face of the disk 63. In the present instance, the head of one of the rivets 73, by means of which the laminations of the armature are secured together, is utilized as this stud. The recesses in the disk 63 are so shaped that when the disk is held against movement and rotative pressure is applied to the armature the stud will be forced out of the recess in which it is seated, the armature and sleeve yielding to permit of this movement, and the stud being then moved into engagement with another recess. If desired, the armature may be provided with two studs and the disk with two series of recesses arranged on opposite sides of its axis, as shown in Fig. 12. When pressure is applied to the finger piece 71 of the sleeve 68 the shaft and disk 63 will move with the armature until that yieldable plunger 65 toward which the arm is moved reaches the limit of its movement, thus stopping the movement of the shaft and disk and causing the sleeve and armature to rotate with relation thereto, thereby shifting the armature from one position to the other. By adjusting the armature to its intermediate or neutral position toward one or the other of the pole pieces the plunger may be rendered operative with relation to a selected eye of the patient. When the magnet is energized the occluder disk or shutter 62 will be moved into line with the selected eye and as soon as the magnet is deenergized, or its energization is so reduced that it will no longer retain the armature in the position to which it has been moved, the disk or shutter will be restored to its neutral or inoperative position.

Any suitable means may be provided for alternately illuminating the figures or openings of the fixation objects and for causing the occluder to be operated in timed relation with such illumination. When electric lamps are employed as a source of light the alternate illumination and the darkening thereof is preferably accomplished by a controlling device in the lamp circuit. All the fixation objects may conveniently be connected with the same source of current and controlled by the same controlling device but this is not necessary as they are not used at the same time. The figure or opening in the fixation object may be darkened to any desired extent but more satisfactory results are secured by merely dimming the illumination to such an extent that the figure or opening in the screen will be barely visible in a darkened room. As above explained by maintaining the dim illumination I not only keep the patient's eyes constantly directed toward the fixation object but I secure binocular single vision from one bright illumination to the next. The occluder may be actuated by any suitable means and it may be controlled by the same device which controls the illumination or it may be separately controlled. When electric lamps are employed as a source of light and the occluder is operated by an electro-magnet the circuits for both the lamps and the occluder may be conveniently connected with a single controlling device and I have here illustrated such an arrangement.

Preferably the device for controlling the illumination of the figure comprises a suitable resistance and an automatic switch to cut the resistance into and out of the circuit. This switch may take any suitable form and may be operated in any suitable manner which will cause the figure to be alternately illuminated and darkened, and when the occluder is controlled by this same controlling device the switch may be provided with additional contacts for closing the occluder circuit. In the present apparatus and, as shown in Figs. 2 to 5, this controlling device comprises a casing 75 the rear wall 76 of which is removable to permit access to be had to the interior thereof. The switch is located within the casing and comprises a rotatably mounted disk 77 carried by a shaft 78 and arranged adjacent to the rear wall 76 of the casing. This disk is provided on diametrically opposite sides of its axis with arcuate contact members 79 and 80. Mounted on the wall 47 of the casing are two pairs of fixed contact members 81 and 82 and 83 and 84, respectively. The two pairs of fixed contacts are arranged on opposite sides of the axis of the disk and in the path of the contact members 79 and 80, so that the circuit may be closed through both pairs of stationary contacts at the same or approximately the same time. The contacts of each pair are rigidly mounted on the wall 76 but are adjustable to permit their positions to be varied with relation one to the other or with relation to the contacts of the other pair. As here shown, the wall 47 of the casing has formed therein arcuate slots 85 and 86 and the two pairs of contact members are mounted in the respective slots. Each contact member is in the form of a pin or plunger slidably mounted in a socket 87 which extends through the slot and has on the inner side of the slot a flange 88 which engages the wall 76 at both sides of the slot. The exterior of the socket is screw threaded and a nut or cap 89 is mounted thereon and arranged to engage the outer side of the wall 76 and thus clamp the socket firmly in its adjusted position.

Figure 1:
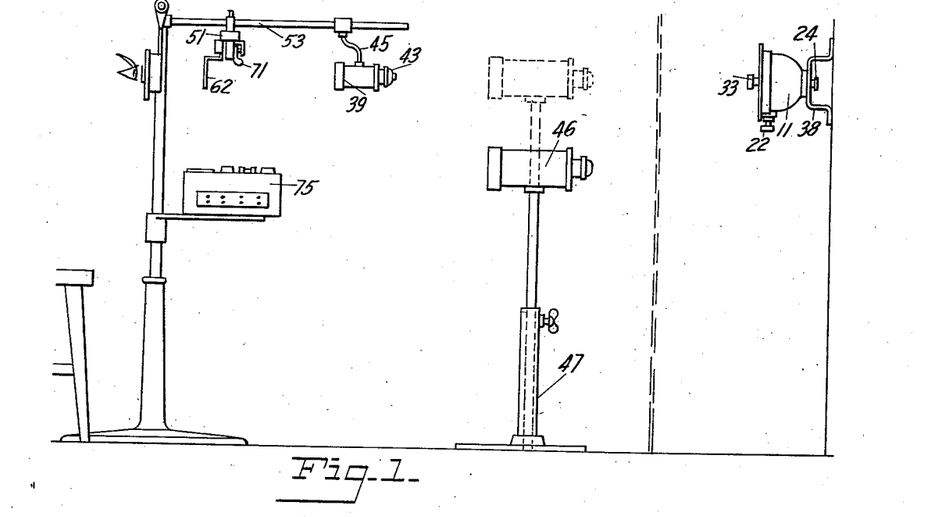
Fig. 1 is a side elevation of the complete apparatus.
Figure 2:
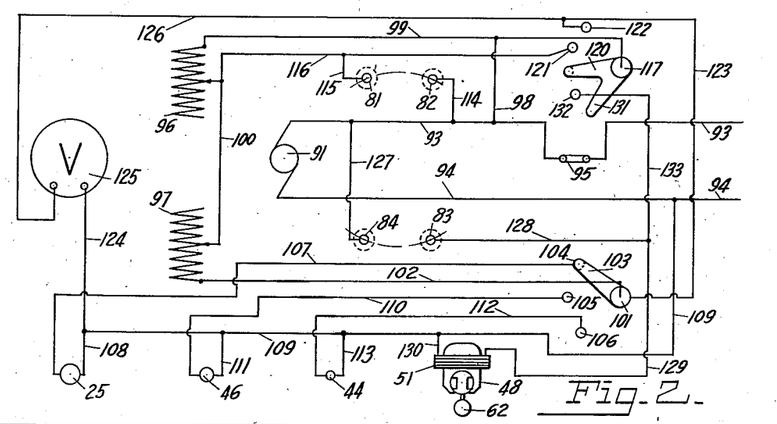
Fig. 2 is a diagram of the circuits for the controlling device.
Figures 3, 4, 5:
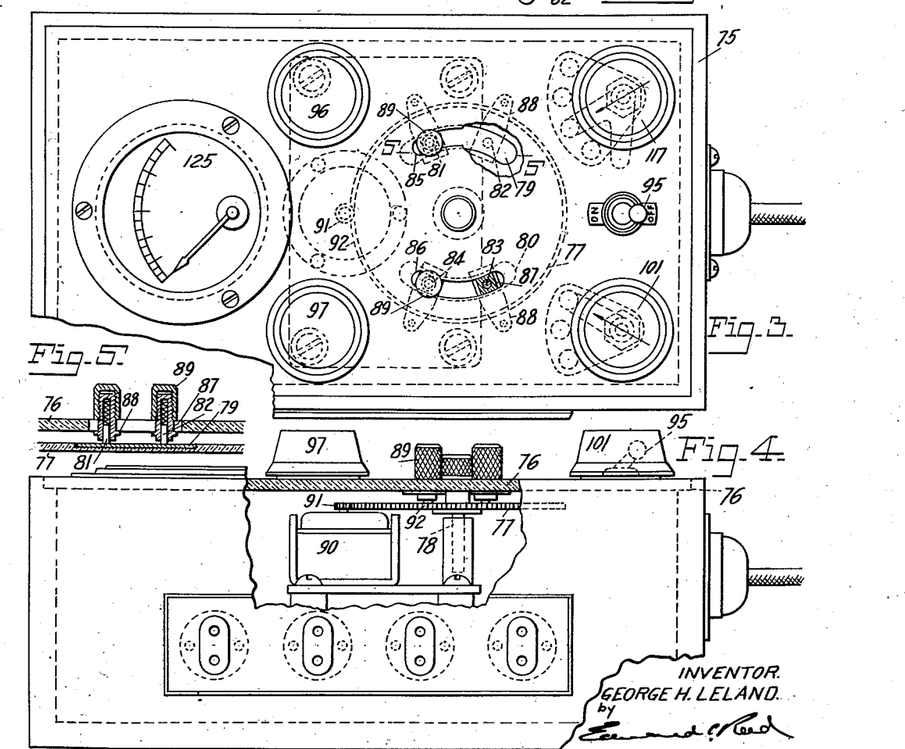
Fig. 3 is a plan view, partly broken away, of the controlling device.
Fig. 4 is a side elevation of the controlling device, partly in section.
Fig. 5 is a detail section taken on the line 5—5 of Fig. 3.

The switch disk 77 is driven by a small electric motor 90 of any suitable type and this motor is provided with a pinion 91 which engages teeth 92 formed in the peripheral edge of the disk. The motor is connected with the source of current or line by conductors 93 and 94 and a manually operated switch 95 is interposed in one of the conductors, in the present instance the conductor 93, and serves not only to start and stop the motor but to control the supply of current to the whole controlling mechanism, as will hereinafter appear. The line conductors 93 and 94 are connected with the lamps in the fixation objects through two rheostats, 96 and 97, the resistance of said rheostats being such as to produce the desired dim illumination when both are in circuit and to produce a relatively bright illumination when rheostat 96 is short circuited. Rheostat 96 is adjustable to vary the extent of the dim illumination and rheostat 97 is adjustable to regulate the intensity of the bright illumination. The line conductor 93 is connected by a conductor 98 with a conductor 99 which is connected with one side of the rheostat 96. The other side of the rheostat 96 is connected by a conductor 100 with the rheostat 97, and the other side of the rheostat 97 is connected with the lamp circuits. If desired, the several lamp circuits may be permanently connected in the circuit so that all of them will be illuminated at the same time, but inasmuch as only one lamp or fixation object is employed at one time I prefer to provide means for selectively connecting the lamps in the circuit and for this purpose I have provided a selective switch 101, and the rheostat 97 is connected by a conductor 102 with a movable contact member or arm 103 of this selective switch. The switch comprises three stationary contacts 104, 105 and 106 and the movable contact member or arm 103 may be moved into engagement with any one of these fixed contacts. The contact 104 is connected by a conductor 107 with the lamp 25 of the distant fixation object and a conductor 108 leads back from the lamp to a return conductor 109 which is connected with the other line conductor 94. The contact 105 is connected by a conductor 110 with the lamp of the intermediate fixation object 46 and this lamp is also connected by a conductor 111 with the return conductor 109. The contact 106 is connected by a conductor 112 with the lamp 44 of the close fixation object, a conductor 113 leading back from this lamp to the return conductor 109. Hence it will appear that when the current flows through the conductors 98—99 and through both rheostats a selected one of the lamps will be dimly illuminated.

As the switch disk 77 rotates the contacts 79 and 80 will successively engage and bridge the fixed contacts 81 and 82 of the automatic switch. The contact 82 is connected with the line conductor 93 by a conductor 114, and the contact 81 is connected by a conductor 115 with a conductor 116 which leads to the conductor 100 beyond the rheostat 96. Consequently when the contacts 81 and 82 are bridged and the circuit closed between the same the rheostat 96 will be short circuited and the current will flow to the lamp or lamps through the rheostat 97 only. As soon as the rear end of the movable contact, 79 or 80, moves out of engagement with one of the fixed contacts the circuit around the rheostat 96 is broken and the circuit through that rheostat re-established. It will be apparent that the rheostat will be short circuited and the lamp or lamps brightly illuminated twice upon each complete rotation of the switch disk.

For the purpose of controlling the illumination of the lamps independently of the automatic switch I have provided the apparatus with a second selective switch 117 which comprises a movable contact member 120 which is connected with the conductor 99. This movable switch member is adapted to be moved into and out of engagement with a fixed contact 121 connected with the conductor 116 and when these switch members are in engagement the circuit will be closed through the conductor 98, switch member 120 and conductor 116 to the conductor 100, thus closing the circuit through the rheostat 97 but short circuiting the rheostat 96 and thereby maintaining the bright illumination so long as the switch members 120 and 121 are in engagement. The switch arm 120 of the switch 117 is also movable into engagement with a contact 122 which is connected by a conductor 123 with the contact arm 103 of the lamp circuit switch 101 and when the circuit is closed between these contact members 120 and 122 the current will flow through the conductor 98, switch arm 120, conductor 123 directly to the lamp circuits, thus short circuiting both rheostats and illuminating the lamp or lamps with a maximum intensity, this illumination being maintained so long as the switch members 120 and 122 remain in engagement.

I also prefer to interpose a voltmeter in the lamp circuit so that the operator may note the voltage at which each examination is made and be thereby enabled to conduct successive examinations at the same voltage so as to secure accurately comparable results. For this purpose the return line 109 of the lamp circuits is connected by a conductor 124 with one side of a voltmeter 125, the other side of which is connected by a conductor 126 with the conductor 124 which leads to the other side of the lamp circuit, at the switch 101.

The fixed contacts 83 and 84 of the automatic switch serve to control the occluder and for this purpose the contact 84 is connected by a conductor 127 with the line conductor 93 and the contact 83 is connected by conductors 128 and 129 with one side of the magnet 51 of the occluder, the other side of the magnet being connected by a conductor 130 with the return conductor 109 of the lamp circuits. Consequently the magnet will be energized twice upon each complete rotation of the switch disk and, the contacts being arranged on diametrically opposite sides of the axis of the disk, the occluder will be actuated simultaneously with the short circuiting of the rheostat 96 and the bright illumination of the lamp or lamps. When the selecting switch 117 is adjusted to maintain the bright illumination of the lamp independently of the automatic switch it is often desirable that the occluder disk or shutter should be maintained in the line of vision of the eye which is not under test and I have therefore provided the selecting switch 117 with a second movable contact arm 131 which is rigidly connected with the contact arm 120 and is so arranged that when the contact arm 120 is in engagement with the fixed contact 121 the arm 131 will be in engagement with a fixed contact 132 which is connected by a conductor 133 with the conductor 129 leading to the occluder magnet and the magnet circuit will thus be closed through conductors 98 and 99, switch arm 131, conductor 133 and conductor 129, thereby retaining the occluder in its operative position by short circuiting the automatic switch.

It will be apparent therefore that when the automatic switch 77 is in operation, and the selective switch 101 has been adjusted to a selected lamp circuit, the fixation object which is associated with the lamp in the selected circuit will be alternately illuminated with a bright illumination and a dim illumination and that simultaneously with the bright illumination that eye of the patient which is not undergoing examination will be occluded so that the patient will view the fixation object only with the eye which is under examination. The bright illumination will be maintained for a brief interval only as it will not begin until one of the movable contacts on the disk 77 is in engagement with both the fixed contacts 81 and 82 and will be terminated as soon as that movable contact moves out of engagement with the fixed contact which was first engaged thereby. By adjusting the contacts 81 and 82 with relation one to the other the duration of the bright illumination may be varied, and the pair of contacts 81 and 82 may be adjusted with relation to the pair of contacts 83 and 84 to accurately time the operation of the occluder with the bright illumination. The duration of the bright illumination and the intervals at which it occurs may vary but I have secured most satisfactory results by causing a bright illumination to occur about every two or three seconds and be maintained for approximately one half a second.

In using this apparatus to test eyes according to my method the patient is seated facing the distant fixation object and at a suitable distance therefrom, usually about twenty feet. However, if the space is limited the patient may face a mirror which in turn faces the fixation object, in a well known manner. When the lamp circuit has been closed the patient is directed to observe the fixation object and to describe its appearance. It will be remembered that the occluding device is operating to occlude one eye simultaneously with the bright illumination or flash of the fixation object and therefore that the patient sees the brightly illuminated figure with one eye only while he sees the dimly illuminated figure with both eyes. At this time the patient is viewing the fixation object without lenses of any kind and if the figure of the fixation object appears to his unaided vision as comprising narrow sharply defined lines, all of the same width, the eye under test is presumably normal. If the eye under test is afflicted with hyperopia or far sightedness the lines of the fixation object will appear to the unaided eye of the patient as of excessive width, often as much as one-half inch in width, and he will probably describe the wide lines as made up of a plurality of narrow lines arranged side by side and close together. If the lines all appear to be of the same width presumably no astigmatism is present and the operator proceeds to determine the extent of the hyperopia by placing before the eye a lens of a value which he thinks will reduce the error partially or completely. If the lines as then viewed by the patient still appear to be broad, although of less width than formerly, another lens of different value is substituted for the first lens, and this is repeated until the patient describes the lines as narrow and sharply defined. To test the accuracy of the patient's description the operator will probably place before the eye another lens affording further correction in the same direction. If the patient then reports that the lines are narrow but are bordered by a glow or corona the operator knows that the eye has been overcorrected and returns to the last previous lens which represents the accurate value of the lens required to neutralize the deviation of that eye from normal. This desired normal or emmetropic position might be described as existing in the narrow valley between the wide or parallel lines on the negative side and the glow or corona of overcorrection on the positive side and in this manner I am able to secure a very definite indication of the extent of the refractive deviation and of the value of the lens required to neutralize the same.

If upon first viewing the illuminated figure with the unaided eye the patient describes the lines as narrow and bordered by a glow or corona this indicates the presence of myopia and the operator proceeds to determine the proper amount of correction by the use of successive trial lenses as before described. Myopia being the opposite of hyperopia requires the use of negative lens but the same procedure may be followed and the artificially normal or emmetropic eye determined by stepping up on the negative side with the wide lines into the edge of the glow caused by the addition of too much plus and then backing toward the negative just barely out of the glow.

If upon first viewing the illuminated object with the unaided eye the patient states that the lines are all wide but that the vertical and horizontal lines are of different widths, this indicates the presence of both hyperopia and astigmatism. The operator thereupon directs the patient to select the narrower line, and places before the eye a succession of trial lenses until the patient states that this line while slightly wide is fairly clear but that the line at right angles thereto is wider. The patient is then directed to select the angular position at which the difference in the widths of the two lines is the greater as the operator slowly rotates the opaque screen first in one direction and then in the other direction. When the proper point has been selected the wide line will appear to be cut off square at its outer end and this square end will be parallel with the other or thin line. The angular position of the wide line, as indicated by the scale on the supporting frame, determines the axis of the cylindrical lens to be used to neutralize the astigmatism of the eye, while the lens which was used indicates the spherical value of the lens to be prescribed. The axis of the cylindrical lens having been determined the operator then proceeds to determine the cylinder value of the required lens by placing before the eye a succession of trial lenses until the patient describes both lines as of substantially the same width and sharply defined. The value of the lens producing this result indicates the cylinder value of the required lens. When the test of one eye has been completed the occluding device is reversed and the other eye tested in a like manner.

After this test has been completed the smaller fixation object is attached to the phoroptor and adjusted to the required close distance, usually from thirteen to sixteen inches from the eye, depending upon the age of the patient or presbyopic condition of the eyes. The same method of test is then followed and each eye is corrected independently of the other, the refractive deviation from normal being neutralized by trial lenses. This test in addition to being a check upon the original test serves to indicate the amount of lag of accommodation behind convergence, which may make necessary a modification of the prescription as indicated by the distant tests.

When the dynamic, or intermediate distant test, is to be made the fixation object 46 is arranged in the line of vision at a distance preferably about one meter from the eyes of the patient, and the examination is then made in the same manner as above described.

After the eyes have been carefully balanced together in their spherical accommodative relations many of the tests may be thereafter taken by making changes of the same value on both eyes simultaneously without the use of the occluder. The intermediate or close tests are frequently made in that manner and ordinarily it is only when there are indications of unbalanced spherical relations between the two eyes that the tests are applied in a monocular manner during the close and dynamic examinations.

It will be apparent from the foregoing description that throughout the examination both eyes of the patient are directed toward the fixation object and are maintained in a state of binocular single vision, that is, the patient sees the object with both eyes but it appears to the two eyes as a single object, this state of binocular single vision being functional during the period of occlusion of one eye. While maintaining this condition of binocular single vision monocular correction is effected by periodically occluding the eye not under test and permitting the patient to actually see the object only with the eye which is under test and making the corrections in accordance with the patient's description of the object as he sees it with the one eye.

While I have described my method and have illustrated one form of apparatus for performing the same I wish it to be understood that I do not desire to be limited to the details thereof as various modifications may occur to a person skilled in the art.

Having now fully described my invention what I claim as new and desire to secure by Letters Patent, is:

1. The method of testing an eye which comprises subjecting both eyes to light rays from a fixation object, controlling the intensity of the light rays at a frequency to maintain direct response to fusion stimulus at all times and freedom from direct response to accommodation stimulus, to thus maintain the eye in a visually relaxed state, and effecting monocular examination of the eye under test to determine refractive error or deviation from normal.

2. The method of testing eyes which consists in subjecting both eyes to light rays emanating from a fixation object at a predetermined distance from the eyes to maintain the response to fusion stimulus at all times, said light being of such wave length as to produce substantially negligible accommodation stimulus, occluding the eye not under test at intervals and effecting monocular correction of the eye under test during the intervals of occlusion.

3. The method of testing eyes which consists in subjecting both eyes to light of controlled character effective to produce fusion stimulus upon the eyes but substantially free from producing accommodation within each individual eye resulting from accommodation stimulus, occluding the eye not under test for successive intervals of such duration as to maintain the eyes subject to fusion stimulus and to such indirect accommodation stimulus as is inherently attendant upon convergence of the eyes, and effecting monocular correction of the eye under test during such intervals.

4. The method of testing eyes which comprises directing both eyes of the patient toward a fixation object, controlling the perception of said fixation object by the patient to retain binocular single vision and while retaining such binocular single vision effecting monocular correction in accordance with the nature of the distortion of the fixation object as it appears to the patient.

5. The method of testing eyes which comprises directing both eyes of the patient toward a continuously visible fixation object, periodically illuminating said object with a bright light, periodically occluding one eye in synchronism with the bright illumination of said fixation object, retaining convergence in binocular vision and effecting monocular correction during the retention of functional binocular vision.

6. The method of testing eyes which comprises subjecting both eyes of a patient to the light of an illuminated fixation object which is inherently free from accommodation stimulus, lessening the perception of the eye which is not under test, retaining a functional state of binocular single vision on said object and simultaneously effecting monocular correction according to the nature of the distortion of the object as it appears to the eye which is being tested.

7. The method of testing eyes which comprises directing the eye under test toward a continuously illuminated figure comprising a narrow line of red light, reducing the illumination of said figure periodically during the test and applying to the eye corrective positive or negative lenses in successive steps as the figure presents to the eye a broad line having the semblance of parallel lines or a single central line with a corona like glow along its edges.

8. The method of testing eyes which comprises directing both eyes of a patient toward a distant fixation object which is inherently free from accommodation stimulus, controlling the perception of said fixation object by the patient to retain a functional state of binocular single vision on said object, and simultaneously effecting monocular correction according to the nature of the distortion of said object as it appears to the eye which is undergoing test, then directing the eyes toward a fixation object close to said eyes and inherently free from accommodation stimulus, retaining binocular single vision and simultaneously effecting monocular correction.

9. The method of testing eyes which comprises subjecting the eye under test to light from an illuminated fixation object which will cause said eye to assume a natural state of rest free from accommodation stimulus, causing said object to appear at intervals to the eye under test alone, noting the nature of any distortion of the fixation object as it appears to the eye under test during the time that it appears to said eye alone, and applying corrective lenses until the fixation object appears normal to the patient.

10. The method of testing eyes which comprises subjecting both eyes of the patient to light from an illuminated fixation object which will cause the eye under test to remain in a natural state of rest free from accommodation stimulus, controlling the perception of said fixation object by the patient to retain binocular single vision, and effecting the monocular correction while binocular single vision is so retained by noting the nature of any distortion of the fixation object as it appears to the eye under test and applying corrective lenses until the fixation object appears normal to the patient.

11. The method of testing eyes which comprises subjecting both eyes of the patient to light from an illuminated fixation object which will cause the eye under test to remain in a natural state of rest free from accommodation stimulus, controlling the perception of said fixation object by the patient to retain binocular single vision, periodically occluding the eye which is not under test, and effecting monocular correction while a functional state of binocular single vision is retained by noting the nature of any distortion of the fixation object as it appears to the eye under test, and applying corrective lenses until the fixation object appears normal to the patient.

12. The method of testing eyes which comprises presenting to the eye which is being examined a continuously visible fixation object comprising a figure of sharp line demarcation, periodically illuminating said figure with a bright light and applying corrective lenses to the eye under test in accordance with the appearance of said figure to the patient during the periods of bright illumination until the patient sees the figure in substantially sharp line demarcation.

13. The method of testing eyes which comprises presenting to the eye which is being examined a continuously visible figure of sharp line demarcation, periodically illuminating said figure with a bright light, occluding the eye which is not under test during the periods of bright illumination, and applying corrective lenses to the eye under test until the patient sees the figure in substantially sharp line demarcation.

14. The method of testing eyes for refractive correction which consists in subjecting both eyes to light rays emanating from a fixation object at a predetermined distance from the eyes and controlling said light to maintain a functional state of binocular single vision, and limiting corrective perception to the eye under test.

15. The method of testing an eye for refractive correction which comprises directing both eyes of a patient toward a fixation object and controlling the perception of said object to maintain a functional state of binocular single vision and to limit corrective perception of the fixation object to the eye under test.

16. The method of testing an eye for refractive correction which comprises directing both eyes of the patient toward a fixation object and controlling the perception of said object to maintain the eyes substantially free from accommodation stimulus but responsive to the fusion stimulus and to limit corrective perception to the eye under test.

17. The method of testing an eye for refractive correction which comprises directing both eyes toward an illuminated fixation object located at a relatively close, intermediate or infinite distance, controlling the illumination of said object to maintain the eyes substantially free from accommodation stimulus and controlling the perception of said object to simultaneously maintain a functional state of binocular single vision and corrective perception with corrective perception limited to the eye under test.

18. The method of testing an eye which comprises directing both eyes of a patient toward a continuously visible fixation object, controlling the perception of the fixation object to cause it to appear to the patient during successive intervals in bright visibility and in relatively dim visibility, and effecting correction of the eye under test in accordance with the distortion of the fixation object as it appears to the patient.

19. The method of testing an eye which comprises directing both eyes of a patient toward a continuously visible fixation object, controlling the perception of the fixation object to cause it to appear to the patient, during successive intervals, in bright visibility and in relatively dim visibility, occluding the eye which is not under test during bright visibility only, and effecting correction of the eye under test in accordance with the distortion of the fixation object as it appears to the patient.

20. In an apparatus for testing eyes, a fixation object comprising an opaque screen having a relatively long narrow opening, means for illuminating said opening with a red light which will cause the same to appear to an ametropic eye either as a broadened line of red light or as a narrow line of red light bordered by a glow, and means for controlling said illumination to produce alternate periods of bright illumination and of relative darkness at regular intervals.

21. In an apparatus for testing eyes, a fixation object comprising a figure of sharp line demarcation, means for illuminating said figure with a red light which will cause the same to appear to an ametropic eye either as a broadened line of red light or as a narrow line of red light bordered by a glow, and means for controlling said illumination to darken said figure at regular intervals but to maintain during the darkened period a dim illumination to keep the eye directed toward said figure.

22. In an apparatus for testing eyes, a continuously visible fixation object suitable for determining refractive errors, and power operated means for periodically brightly illuminating said object at frequent intervals with light which is substantially free from a tendency to stimulate accommodation.

23. In an apparatus for testing eyes, a fixation object suitable for determining refractive errors, power operated means for periodically brightly illuminating said object at frequent intervals with light which is substantially free from a tendency to stimulate accommodation and means for occluding the eye which is not under test during the periods of bright illumination only.

24. In an apparatus for testing eyes, a continuously visible fixation object suitable for determining refractive errors and having means for presenting to the eyes of the patient a sharply defined line of light, and power operated means for alternately illuminating and darkening said object at frequent intervals, visibility being maintained during the darkened intervals.

25. In an apparatus for testing eyes, a continuously visible fixation object suitable for determining refractive errors and having means for presenting to the eyes of the patient a sharply defined line of light, and power operated means for alternately illuminating said object with a bright light and with a dim light.

26. In an apparatus for testing eyes, a continuously visible fixation object suitable for determining refractive errors and having means for presenting to the eyes of the patient a plurality of sharply defined radial lines of light, each line being continuous from end to end, power operated means for alternately illuminating and darkening said object at frequent intervals.

27. In an apparatus for testing eyes, a fixation object comprising four sharply defined radial lines of light arranged about a common center at right angles one to the other and having their inner ends spaced from said center, and power operated means for brightly illuminating said object at spaced intervals of time and for dimly illuminating said object between the brightly illuminated periods.

28. In an apparatus for testing eyes, a fixation object comprising a sharply defined line of light, power operated means for alternately illuminating and darkening said object at regular intervals, and means for occluding one eye during the period of illumination only.

29. In an apparatus for testing eyes, a fixation object comprising a sharply defined line of light, power operated means for alternately illuminating said object with a bright light and a dim light, and means operating in timed relation to said illuminating means to occlude one eye during the period of bright illumination only.

30. In an apparatus for testing eyes, a continuously visible fixation object, suitable for determining refractive errors, comprising an opaque screen having a narrow elongated opening therethrough, and means for alternately illuminating and darkening said opening at frequent intervals.

31. In an apparatus for testing eyes, a continuously visible fixation object, suitable for determining refractive errors, comprising an opaque screen having a narrow elongated opening therethrough, and means for alternately illuminating and darkening said opening at predetermined intervals of time, the intervals of illumination being substantially shorter than the intervals of darkness.

32. In an apparatus for testing eyes, a fixation object comprising an opaque screen having a narrow elongated opening therethrough, means for illuminating said opening with a red light, and means for controlling said illuminating means to cause said opening to be alternately illuminated and darkened at predetermined intervals of time.

33. In an apparatus for testing eyes, a fixation object comprising an opaque screen having a narrow elongated opening therethrough, and means for brightly illuminating said opening for a predetermined interval of time and then dimly illuminating said opening for a succeeding interval of time.

34. In an apparatus for testing eyes, a fixation object comprising an opaque screen having a narrow elongated opening therethrough, means for brightly illuminating said opening with a red light for a predetermined interval of time and then dimly illuminating said opening with a red light for a succeeding interval of time.

35. An apparatus for testing eyes comprising a continuously visible fixation object suitable for determining refractive errors, and means for controlling the visibility of said fixation object to impart thereto successively, during recurring intervals, a bright visibility and a dim visibility.

36. An apparatus for testing eyes comprising a continuously visible fixation object suitable for determining refractive errors, means for controlling the visibility of said fixation object to impart thereto successively, during recurring intervals, a bright visibility and a dim visibility, and means for occluding the eye which is not under test during the periods of bright visibility only.

37. In an apparatus for testing eyes, an opaque screen having a narrow elongated opening therethrough, an electric lamp arranged in the rear of said screen to illuminate said opening, a color screen interposed between said lamp and said opaque screen, and a power operated controlling device in circuit with said lamp to cause said opening to be alternately illuminated and darkened at predetermined intervals of time.

38. In an apparatus for testing eyes, an opaque screen having a narrow elongated opening therethrough, an electric lamp arranged in the rear of said screen to illuminate said opening, a color screen interposed between said lamp and said opaque screen, power operated means for cutting resistance into and out of the circuit for said lamp to cause said opening to be brightly illuminated for a predetermined period of time and to be then dimly illuminated for a succeeding period of time.

39. In an apparatus for testing eyes, a fixation object, means for alternately illuminating and darkening said object, an occluding device having a part movable into and out of the line of vision of the eye which is not undergoing test, and means for actuating said occluding device in timed relation to said illuminating means to cause the vision of said eye to be occluded during the period of illumination of said object.

40. In an apparatus for testing eyes, an opaque screen having a narrow elongated opening therethrough, means for alternately illuminating and darkening said opening at regular predetermined intervals of time, and means actuated in timed relation with said illuminating means to occlude the vision of one of the eyes during the period of illumination only.

41. In an apparatus for testing eyes, a fixation object comprising a figure of sharp line demarcation, means for illuminating said figure, means for controlling said illuminating means to cause said figure to be alternately illuminated and darkened, an occluding device having having a part movable into and out of the line of vision of one of the eyes under test, and means operating substantially in unison with said illumination controlling means to move said part of said occluding device into said line of vision at the beginning of each period of illumination and to move the same out of said line of vision at the end of said period of illumination.

42. In an apparatus for testing eyes, an opaque screen having a narrow elongated opening therethrough, an electric lamp arranged in the rear of said screen to illuminate said opening, a controlling device in circuit with said lamp to cause said opening to be alternately illuminated and darkened at predetermined intervals of time, an occluding device having a part movable into and out of the line of vision of the eye which is not under test, and an electrical actuating device for said occluding device controlled in coordination with the controlling device in said lamp circuit.

43. In an apparatus for testing eyes, an opaque screen having a narrow elongated opening therethrough, an electric lamp arranged in the rear of said screen to illuminate said opening, a controlling device in circuit with said lamp to cause said opening to be alternately illuminated and darkened at predetermined intervals of time, an occluding device having a part movable into and out of the line of vision of the eye which is not under test, and actuating means for said occluding device comprising a magnet connected in circuit with said controlling device for said lamp circuit.

44. In an apparatus for testing eyes, an opaque screen having a narrow elongated opening therethrough, an electric lamp arranged in the rear of said screen to illuminate said opening, a controlling device in circuit with said lamp to cause said opening to be alternately illuminated and darkened at predetermined intervals of time, an occluding device having a part movable into and out of the line of vision of the eye which is not under test, an electrical actuating device for said occluding device controlled in coordination with the controlling device in said lamp circuit, and means for selectively controlling the operation of said occluding device to cause it to move into and out of the line of vision of either eye.

45. In an apparatus for testing eyes, a fixation object comprising a figure to be illuminated, and a lamp for illuminating said figure, a controlling device to cause said lamp to be alternately illuminated with a bright light and a dim light and comprising a resistor connected in circuit with said lamp, a switch comprising fixed contacts one of which is connected with said lamp circuit between said resistor and said lamp, a rotary member having a contact movable into simultaneous engagement with said fixed contacts to short circuit said resistor, a motor for driving said rotatable member, and a manually operated switch to close the circuit across the terminals of said resistor independently of the first mentioned switch.

46. In an apparatus for testing eyes, a fixation object comprising a figure to be illuminated and a lamp for illuminating said figure, an occluder comprising a magnet, a rotary switch having fixed contacts connected in circuit with said lamp and other fixed contacts connected in circuit with said magnet, and a rotary member having contacts arranged to successively engage said fixed contacts and simultaneously close the circuit through said lamp and said magnet, and a motor for rotating said rotary member.

47. In an apparatus for testing eyes, an occluding device adapted to be interposed between the eyes of the patient and a fixation object, and having a part movable into and out of the line of vision of the eye not under test, and mechanism to so actuate said part as to periodically occlude the eye which is not under test and to leave the vision of the eye under test unobstructed at all times.

48. In an apparatus for testing eyes, an occluding device adapted to be interposed between the eyes of a patient and a fixation object and having means for occluding one eye only, electrically operated means for actuating said device, and means for controlling said electrically operated means to cause said device to occlude said one eye at predetermined intervals.

49. In an apparatus for testing eyes, a device adapted to be interposed between the eyes of a patient and a fixation object and having means for occluding only that eye of the patient which is not under test, a magnet for actuating said occluding means, and a power operated controlling device for intermittently energizing said magnet.

50. In an apparatus for testing eyes, an occluding device comprising a magnet, a single disk mounted for oscillatory movement into and out of the line of vision of one eye only of the patient, an armature for said magnet operatively connected with said disk, and power operated means for intermittently energizing said magnet.

51. In an apparatus for testing eyes, an occluding device comprising an oscillatory disk, a magnet having spaced pole pieces, an armature for said magnet operatively connected with said disk and arranged normally in a neutral position between said pole pieces, means for adjusting said armature into operative relation with either of said pole pieces, and power operated means for causing said magnet to be intermittently energized.

52. In an apparatus for testing eyes, a fixation object comprising a figure to be illuminated, a lamp for illuminating said figure, a controlling device to cause said lamp to be illuminated alternately with a bright light and a dim light and comprising a resistor adapted to be connected in circuit with said lamp, a rotary switch adapted to cut such resistor into and out of said lamp circuit, and a motor for continuously rotating said switch.

53. In an apparatus for testing eyes, a fixation object comprising a figure to be illuminated, a lamp for illuminating said figure, a controlling device to cause said lamp to be illuminated alternately with a bright light and a dim light and comprising a resistor adapted to be connected in circuit with said lamp, a switch comprising fixed contacts connected in said lamp circuit across the terminals of said resistor, and a rotary device having a contact member movable into simultaneous engagement with said fixed contacts to short circuit said resistor, and a motor for driving said rotatable member.

54. In an apparatus for testing eyes, a fixation object comprising a plurality of radial lines spaced one from the other, and adjustable means for obscuring one or more intermediate lines while the lines on opposite sides of said intermediate line or lines remain visible.

55. In an apparatus for testing eyes, a fixation object comprising a plurality of lines spaced one from the other, and an adjustable shutter having a plurality of openings adapted to register simultaneously with the corresponding lines of said object and so arranged that a part of the openings in said shutter may be moved out of register with the corresponding lines of said object while another part of the openings in said shutter remain in register with the corresponding lines of said object.

56. In an apparatus for testing eyes, a fixation object comprising a screen having a plurality of radial slots spaced one from the other, means for illuminating said slots, a normally stationary shutter mounted for adjustment about an axis adjacent to the inner ends of the slots in said screen and having a plurality of radial slots to register with the respective slots in said screen, the slots in said shutter being of different widths whereby a partial rotation of said shutter will obscure a part only of the slots in said screen.

GEORGE H. LELAND.